UNITED STATES PATENT OFFICE.

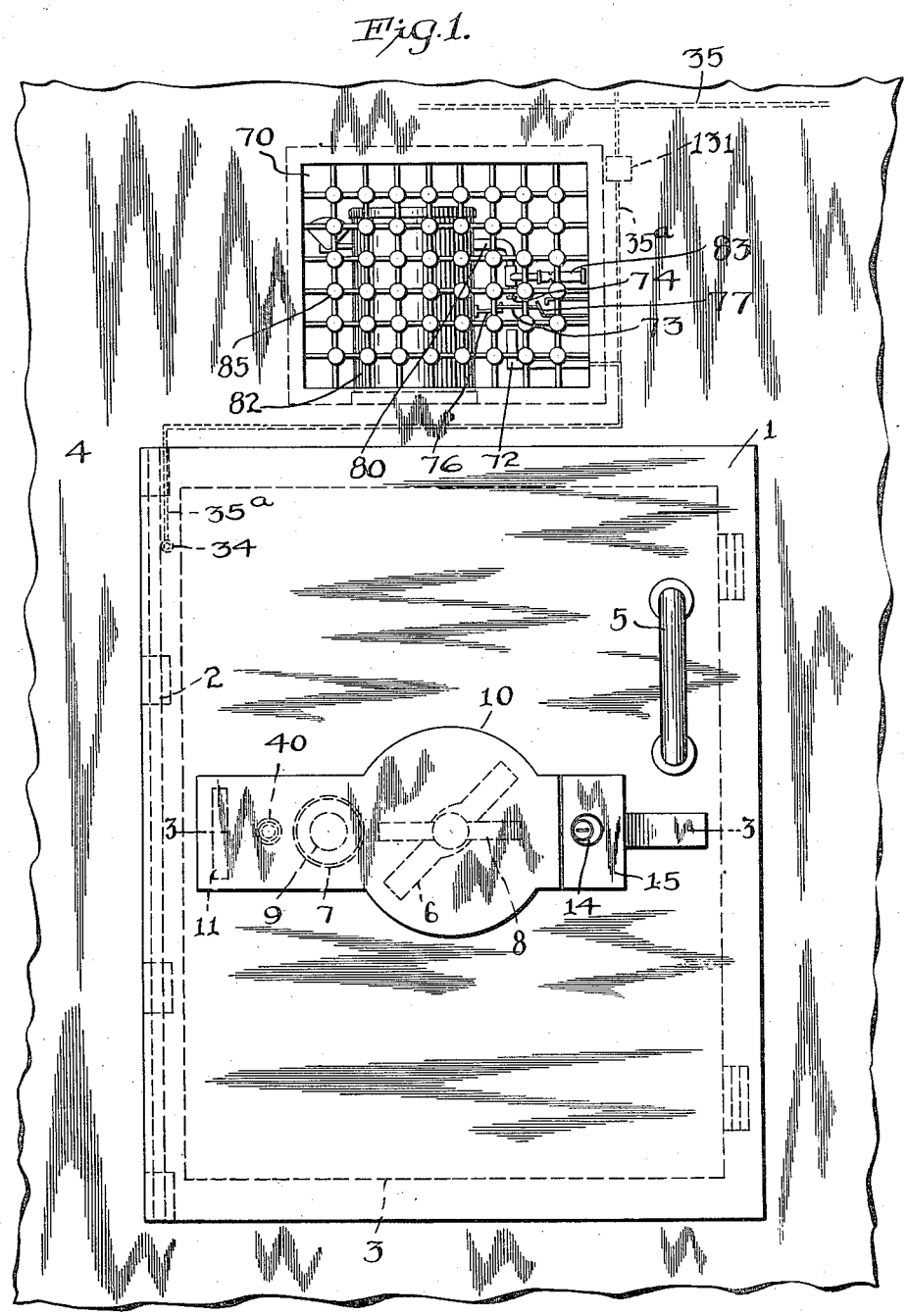

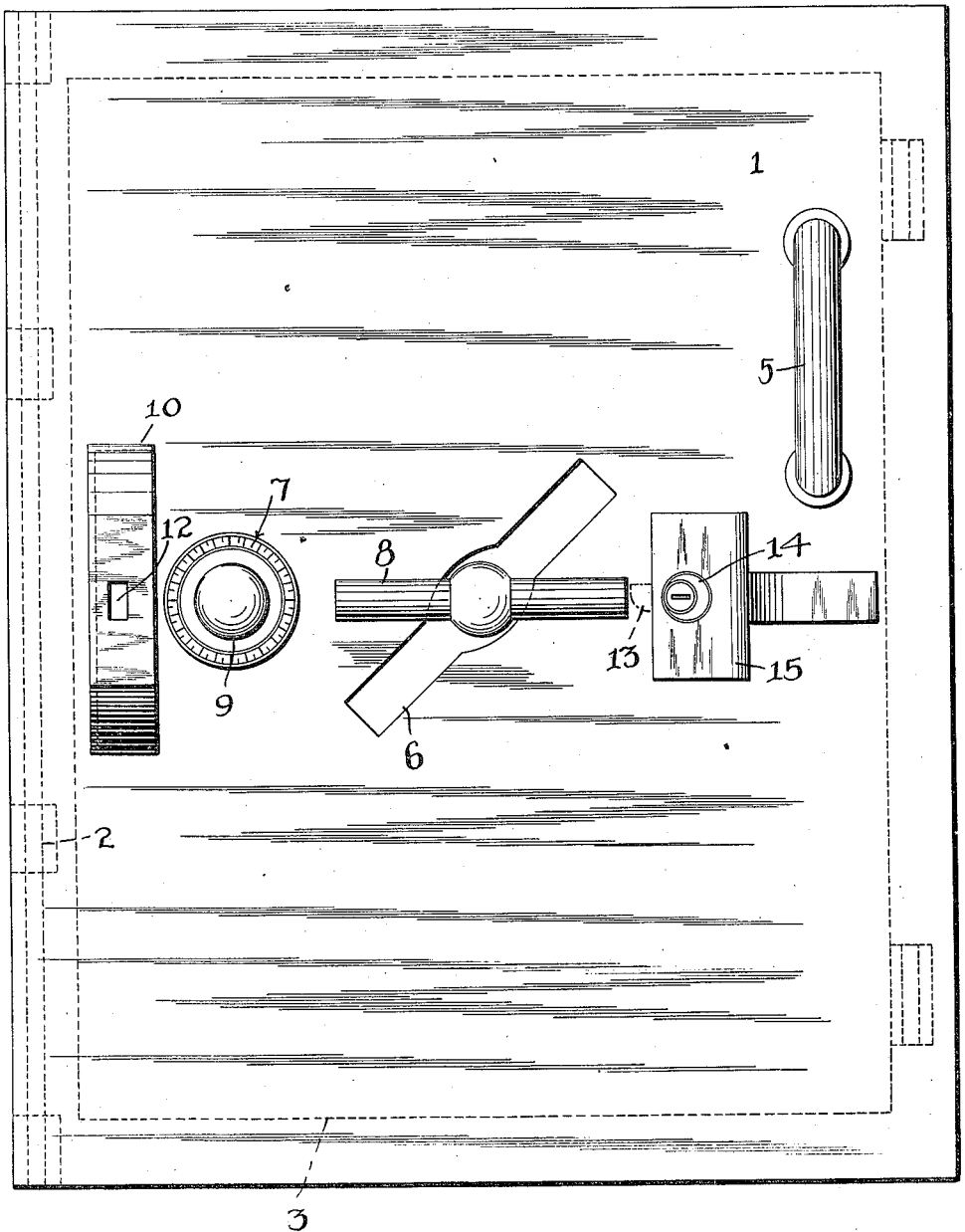

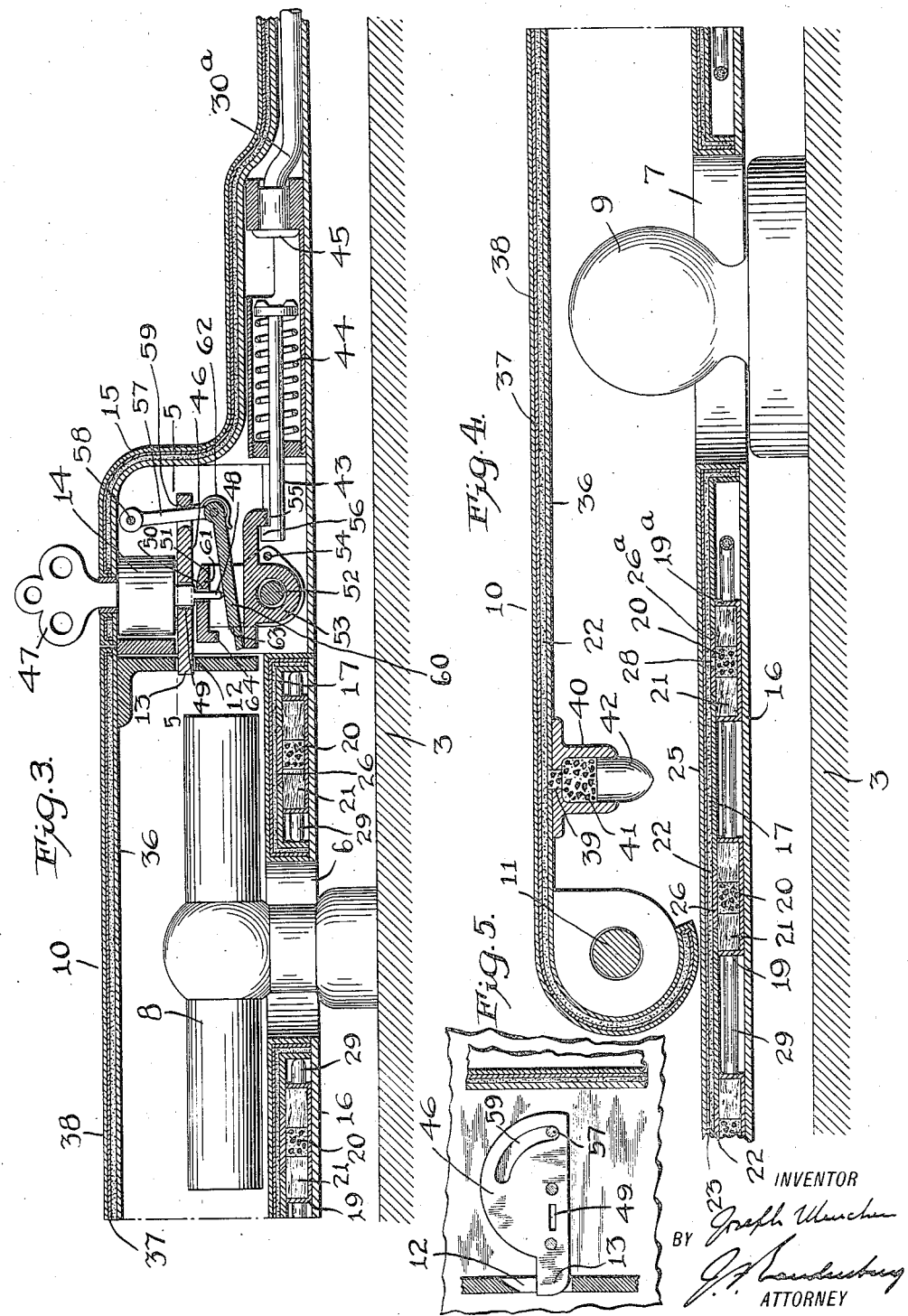

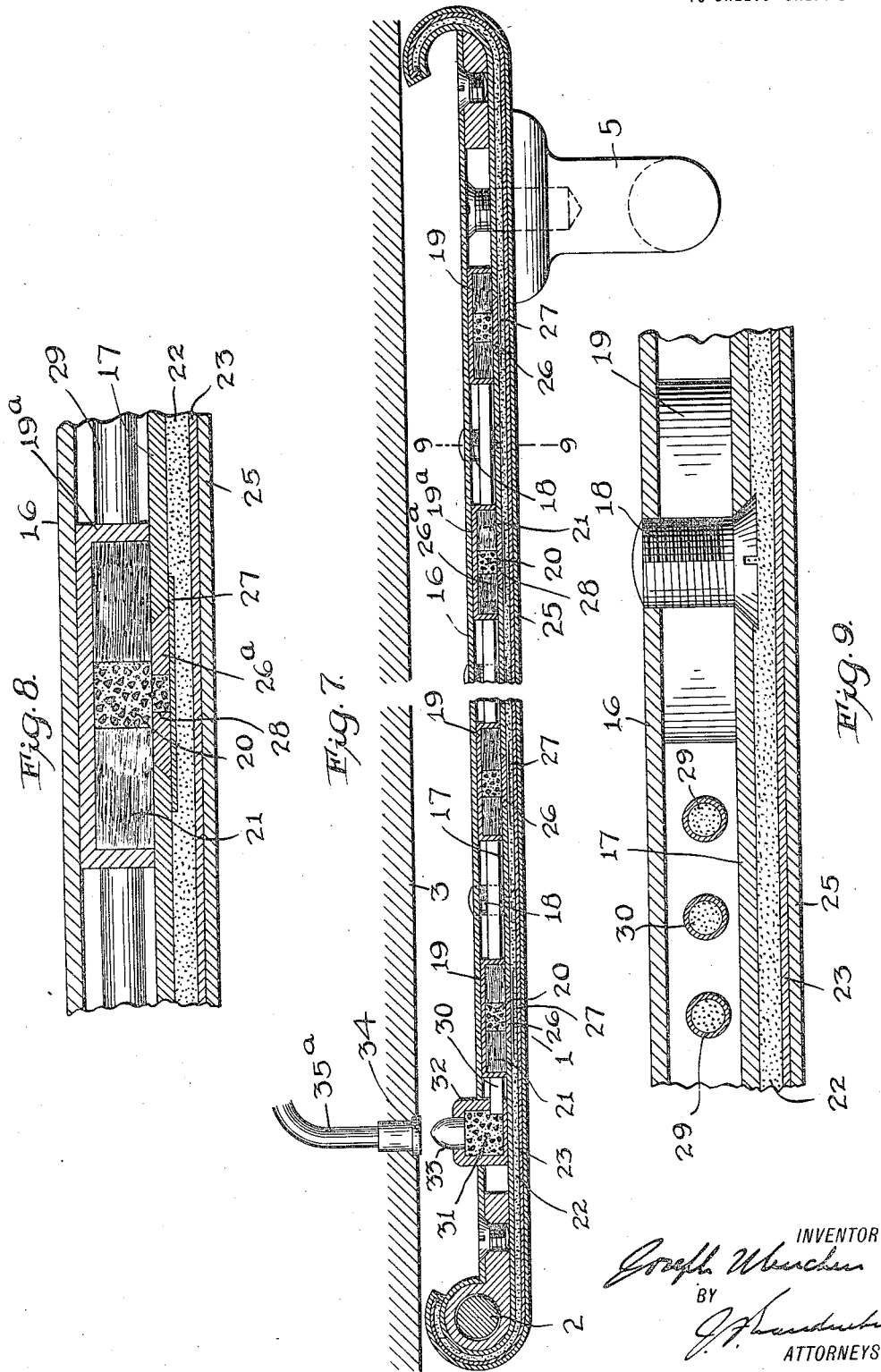

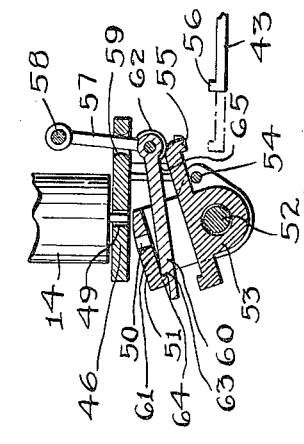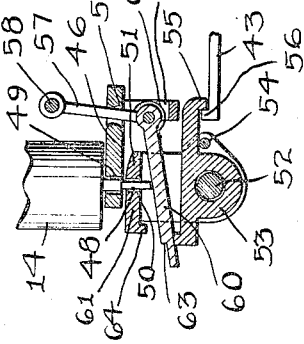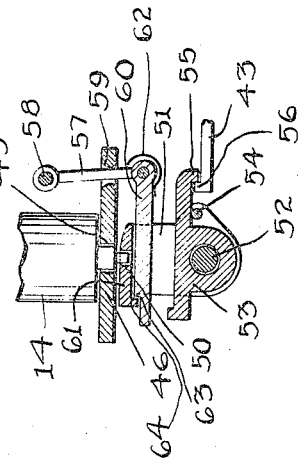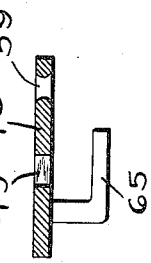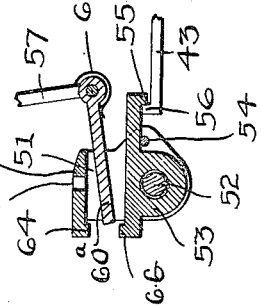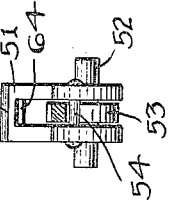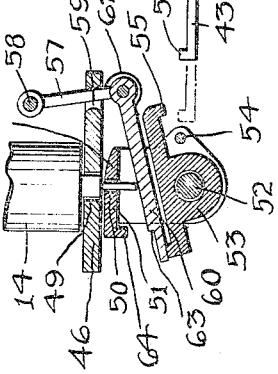

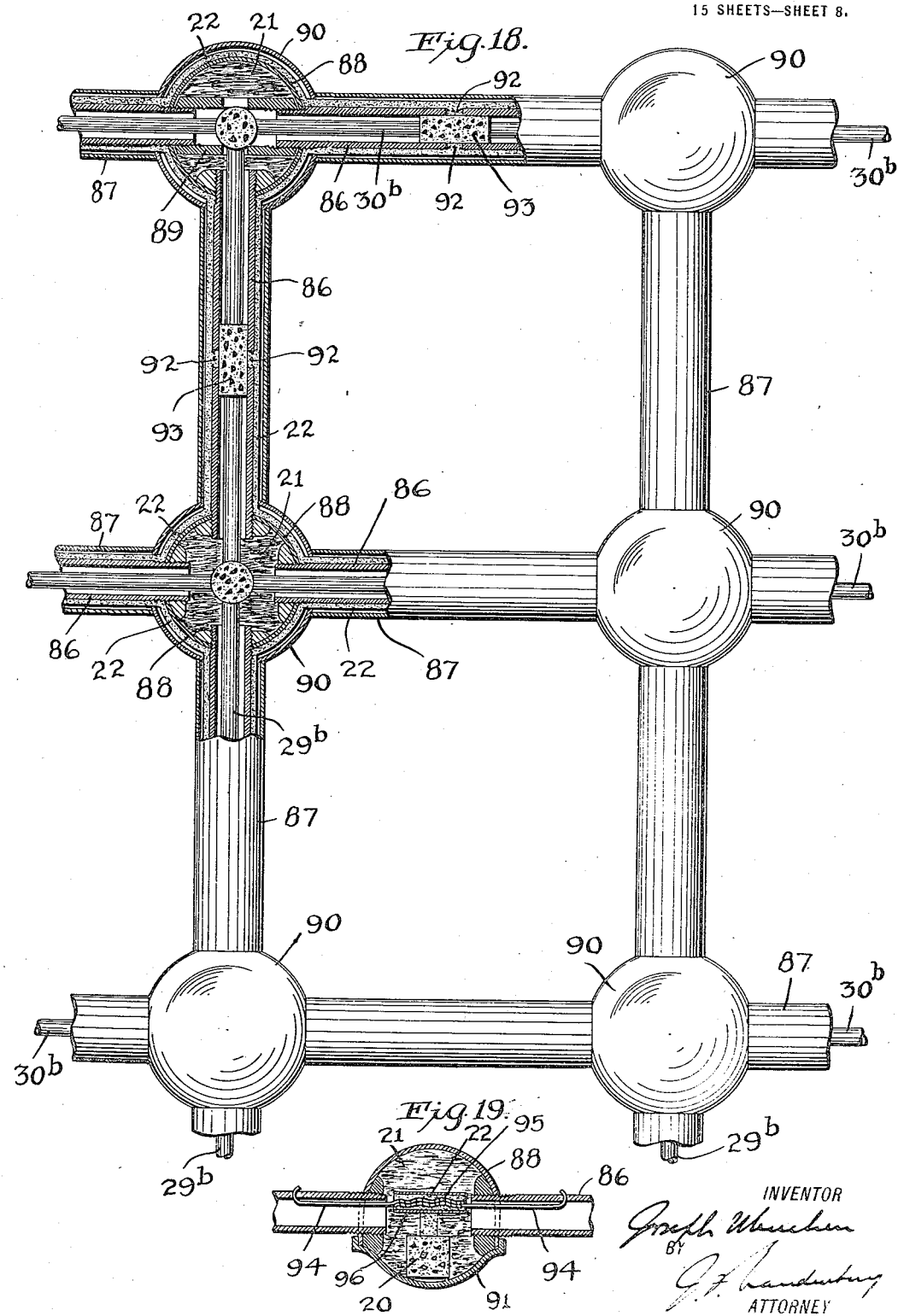

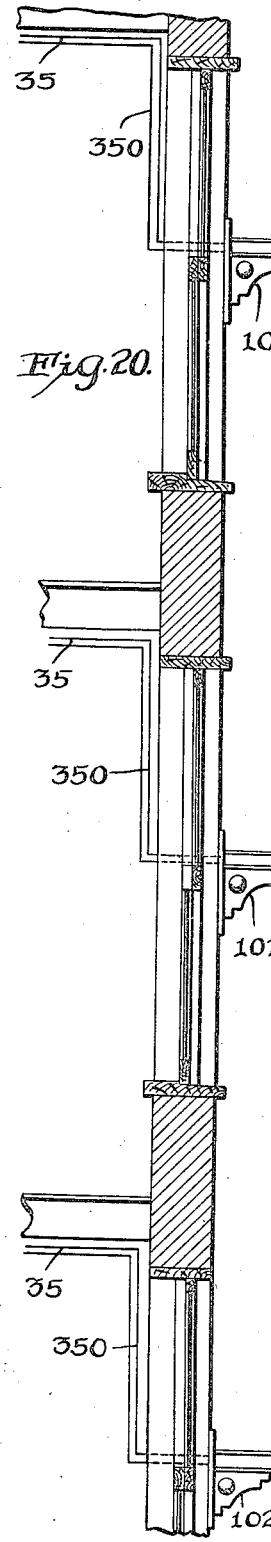
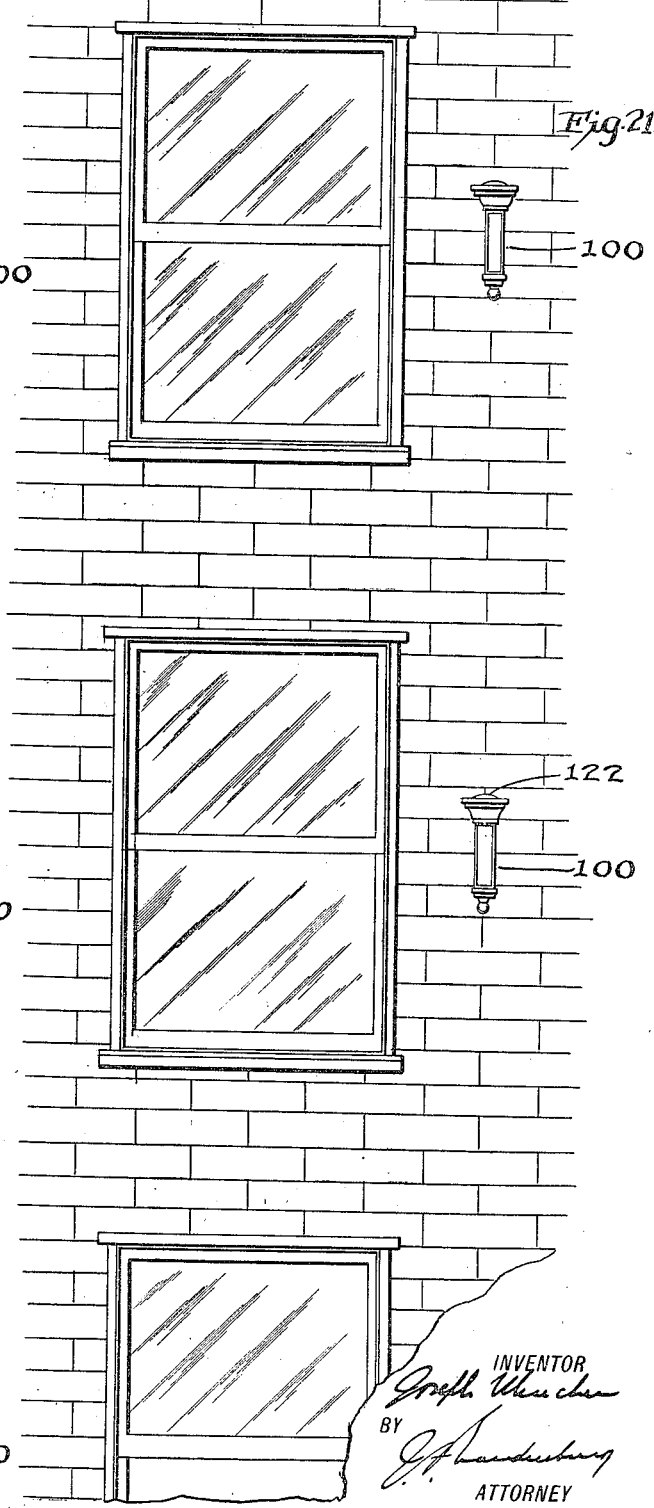

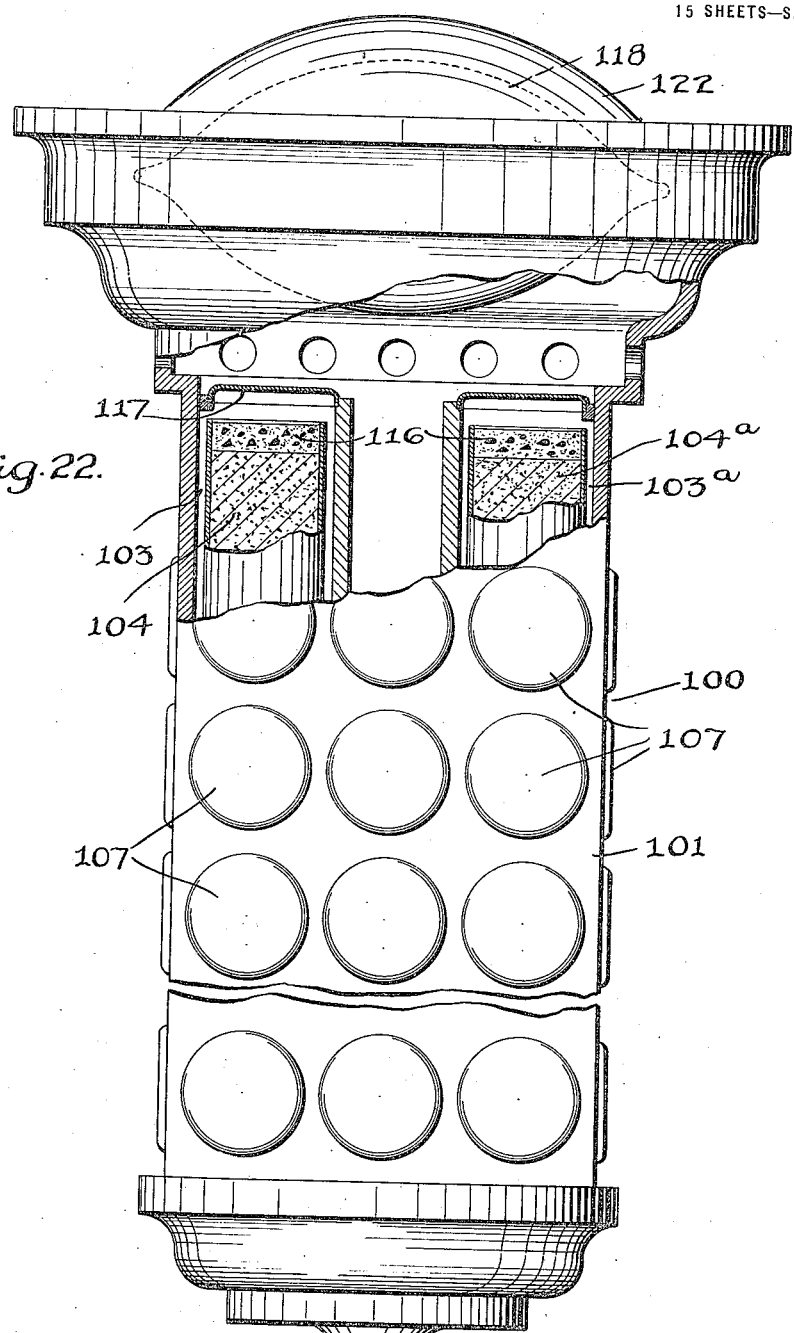

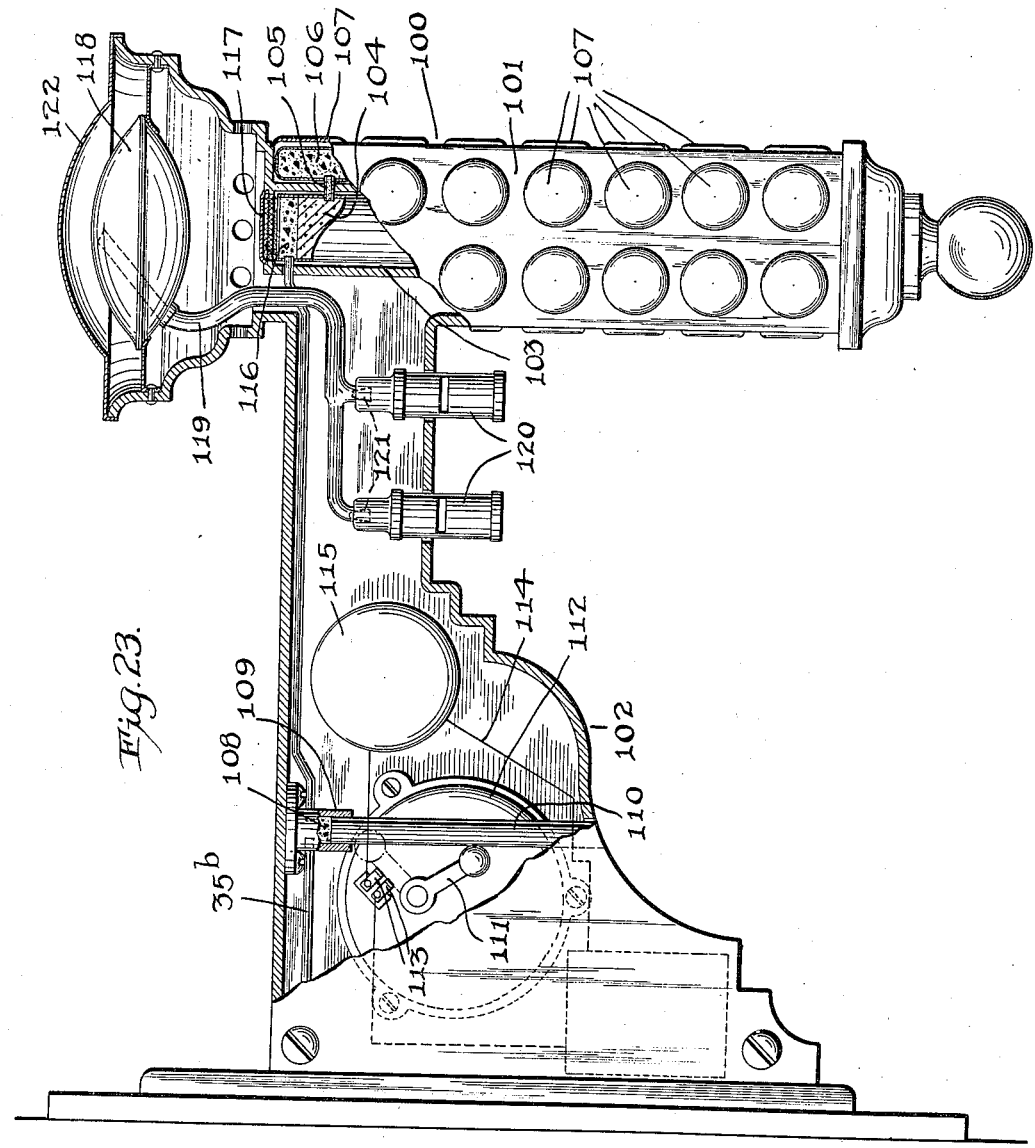

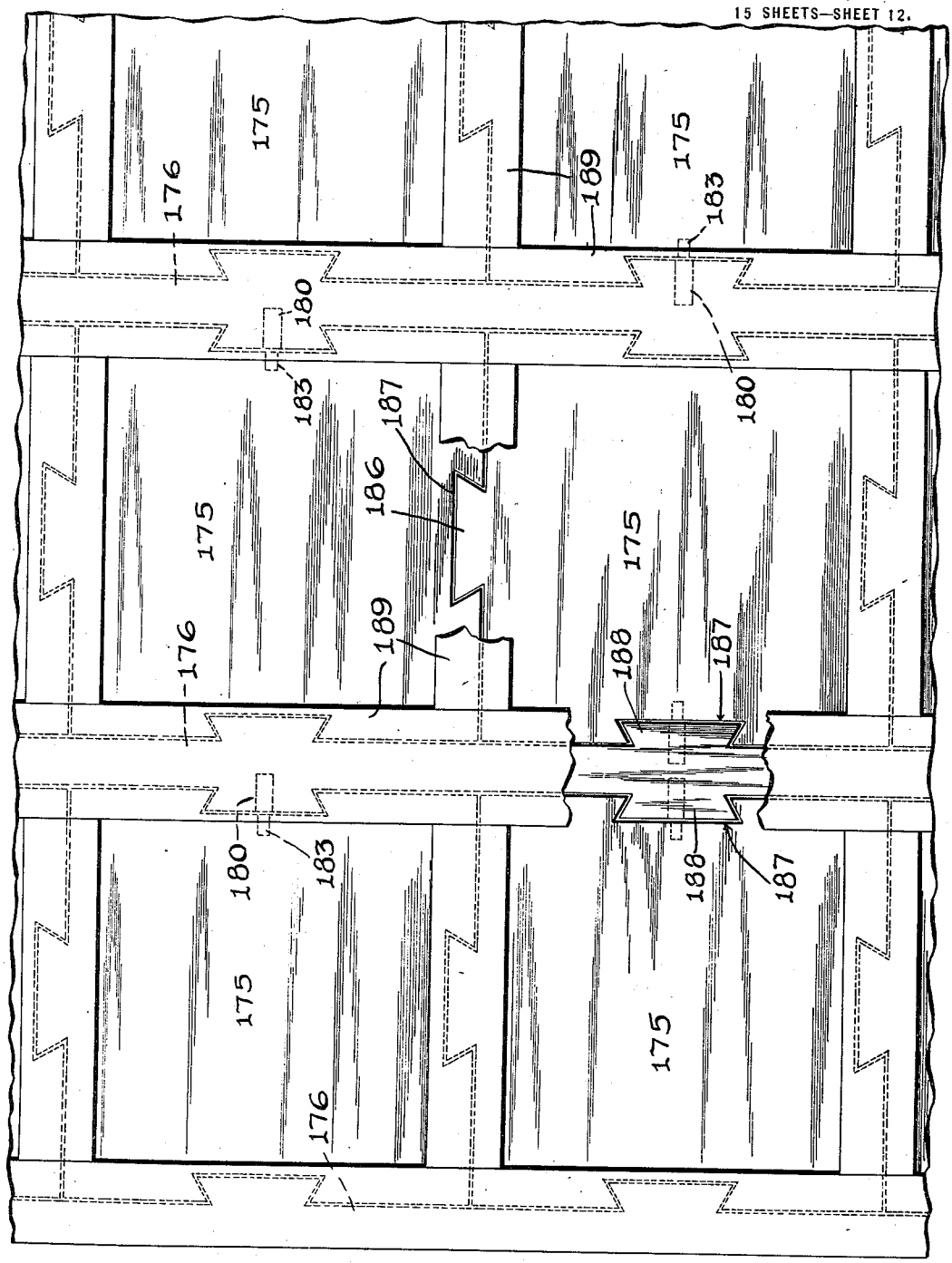

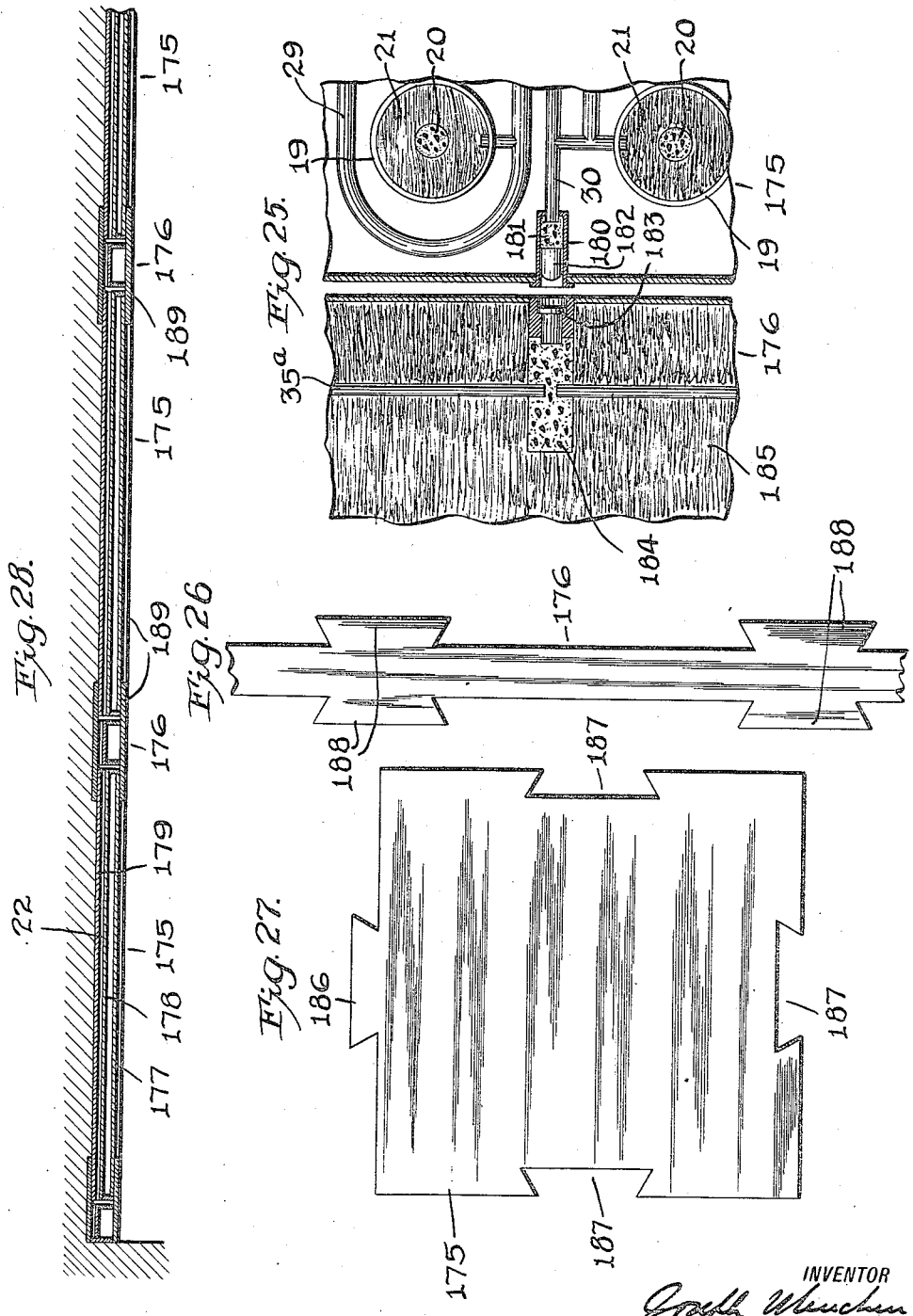

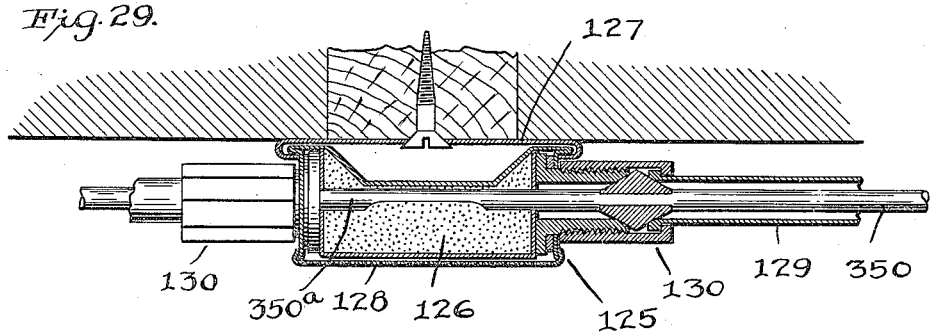
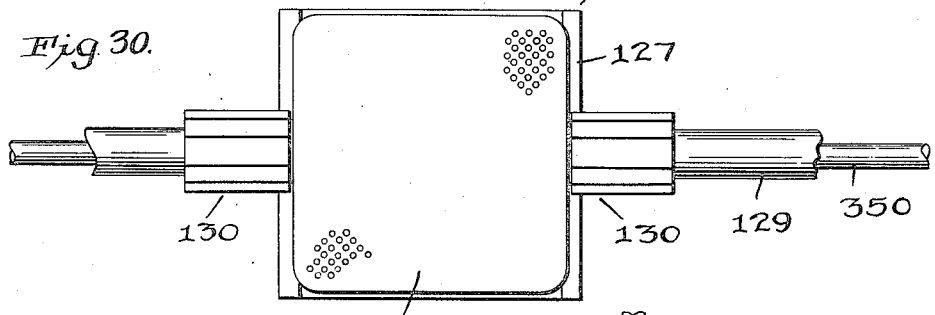
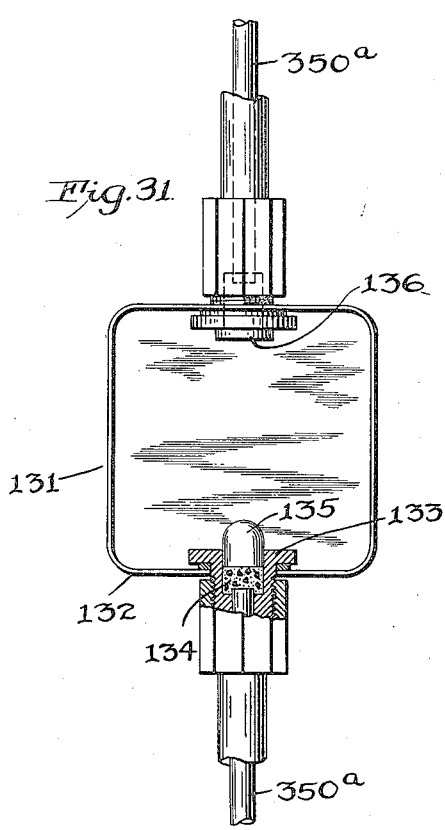
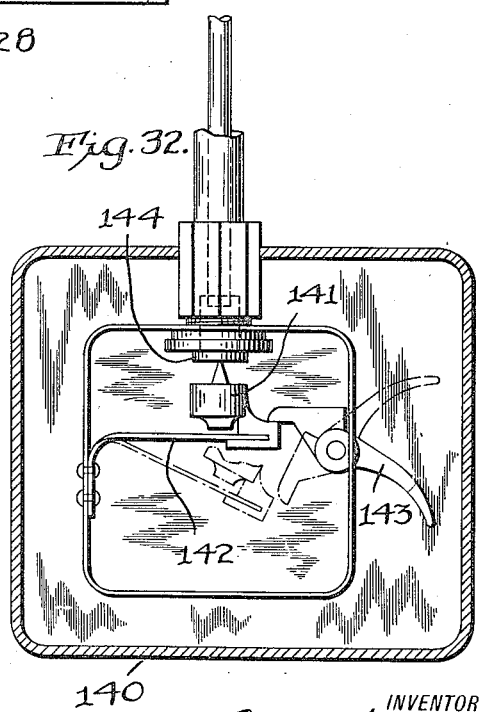

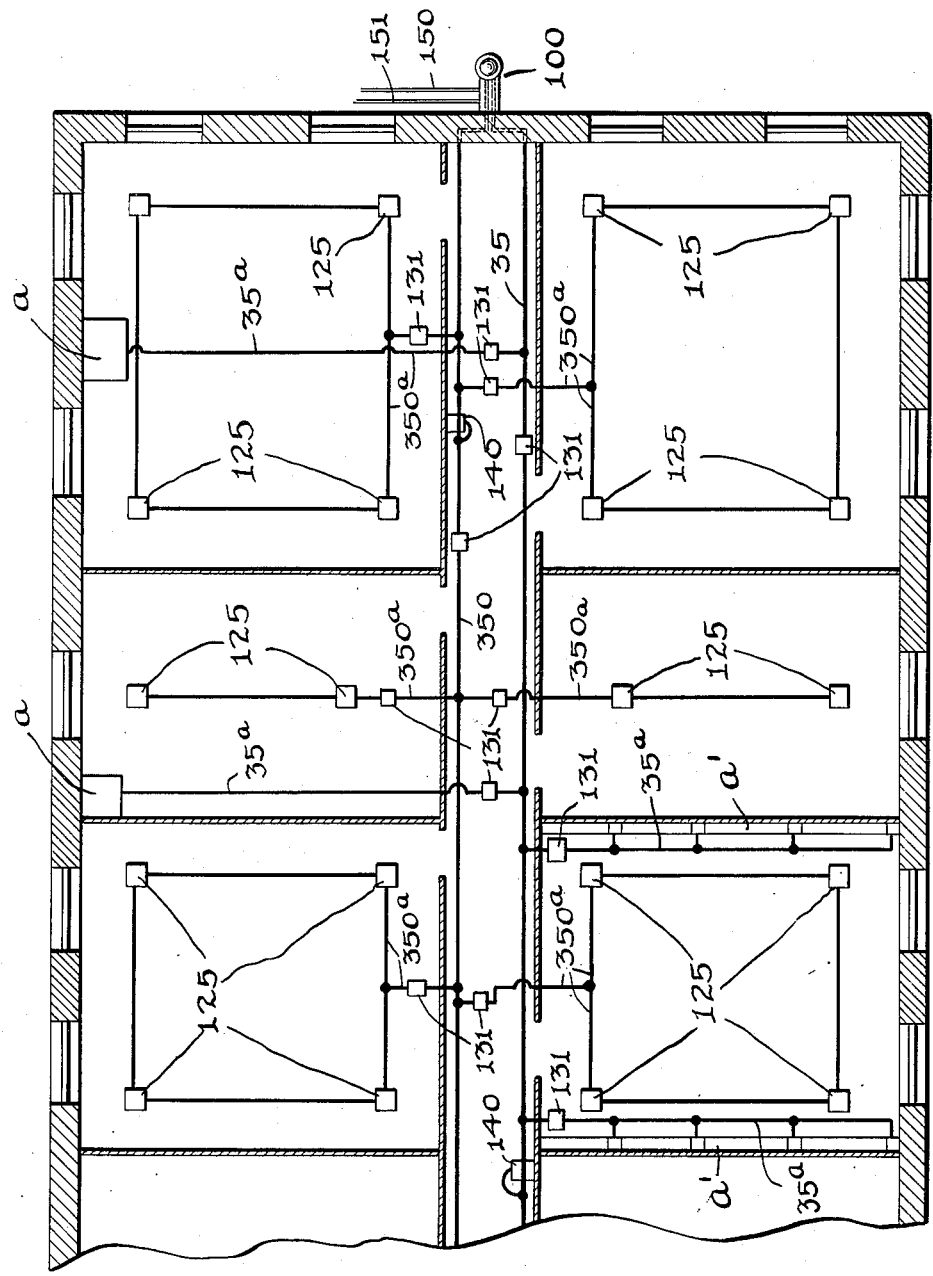

JOSEPH MENCHEN, OF NEW YORK, N. Y.

PROTECTIVE AND ALARM SYSTEM.

1,377,264.  Specification of Letters Patent.  Patented May 10, 1921.

Application filed June 26, 1920. Serial No. 392,058.

*To all whom it may concern:*

Be it known that I, JOSEPH MENCHEN, a citizen of the United States, and a resident of the borough of Manhattan, in the city, county, and State of New York, have invented certain new and useful Improvements in Protective and Alarm Systems, of which the following is a specification.

The invention comprises certain novel features in protective and alarm systems, involving the use of explosive and combustible materials for originating and transmitting disturbances, designed to baffle the unlawful attempts of thieves and burglars and to create an alarm both at the scene of the attempt and at a distance. The invention also includes means whereby, in event of attempted theft or burglary, discharges of incapacitating gases are produced, which either prevent the lawbreaker attaining his object or rendering him helpless. The invention also includes a novel fire alarm system, relying upon the action of explosive and combustible materials, and numerous features applicable to both systems. The invention further includes the provision upon the outside of the building of a plurality of signals connected with the interior system or systems, whereby public indication is given of the occurrence and location of an unlawful attempt or a fire, or both, within the building. An important feature comprises a non-reversible transmitter, which enables two or more units or loci of original disturbance to be connected with a common fuse or combustible transmission system without causing a disturbance to be communicated from one unit to another, so that it is necessary to replace or restore only the unit or units directly affected.

In the case of the burglary or theft-preventive system the disturbance originates in a combustible barrier which is capable of embodiment in various forms and locations, as, for example, a shield for safe or vault fronts, a covering around or applied directly to objects, an inclosure for a space to be protected, a grill for windows, openings and the like, etc. Such barrier contains combustible materials adapted to produce either continuing detonations or discharges of incapacitating gases, or both, in connection with a distributed ignition element or compound of a character to be ignited by blows or pentration, so that forcible tampering at any point immediately causes manifestations extending over a substantial period, calculated to disconcert or overpower the lawbreaker and to give warning of his activities. Combined with such barrier there may be, and preferably are, arrangements whereby the disturbance is transmitted from the barrier to alarm- or fume-producing means in the vicinity or at a remote point or both. The barrier, as, for example, the safe or vault shield, can be made movable, so as to afford access to the part or region to be protected, and in connection therewith a lock is provided, which in event of tampering or an attempt to pick it or unlock it with an improper key is adapted to initiate disturbances similar to those occasioned by an attack upon the shield itself. A lock embodying similar principles may be used for a variety of purposes.

The application is a continuation in part of my prior application Serial No. 328,736, filed October 6, 1919.

In the accompanying drawings forming a part hereof:

Figure 1 is a front elevation of a protective and alarm shield for safe or vault fronts, in protecting position, the view showing also means external to the shield and connected therewith by a fuse or train;

Fig. 2 is an enlarged front elevation of the shield with the supplementary shield open;

Figs. 3 and 4 are complementary views constituting an enlarged horizontal section on the line 3—3 of Fig. 1;

Fig. 5 is a section on the line 5—5 of Fig. 3;

Fig. 7 is a horizontal section through the shield proper as a whole, with its intermediate portion broken away, and illustrating the means for transmitting the disturbance from the shield to a fuse extending in the stationary structure;

Fig. 8 is an enlargement of a portion of Fig. 7;

Fig. 9 is a section taken as on the line 9—9 of Fig. 7;

Figs. 10 to 13 are sectional elevations of the lock, showing different operative conditions;

Fig. 14 is an elevation of the compound trigger, looking at right angles to the preceding views;

Fig. 15 is a side sectional elevation of a modified form of the trigger mechanism;

Fig. 16 is a section through the cam plate seen in Figs. 10 to 13;

Fig. 18 is an enlarged fragmentary view, partly in front elevation and partly in section, of a grill such as seen in Fig. 1;

Fig. 19 is a horizontal section through a junction portion of the grill;

Fig. 20 is a section through an exterior wall of the building, showing outside signals at the several floors and outside the several rooms or apartments thereof;

Fig. 21 is a face view of Fig. 20;

Fig. 22 is an enlarged front elevation, with a portion broken away in section, of one of the outside signals shown in Figs. 20 and 21;

Fig. 23 is a view, partly in side elevation and partly in vertical section, of one of said signals and its supporting bracket and associated alarm mechanism;

Fig. 24 is a view of a portion of a wall facing or lining for an apartment, portions being broken away;

Fig. 25 is a fragmentary section through two portions of such wall-facing, taken parallel with the planes thereof;

Fig. 26 is a face view of a fragment of one of the members;

Fig. 27 is a face view of another member;

Fig. 28 is a cross-section through a portion of a wall-facing composed of such members;

Fig. 29 is a vertical section through an alarm-initiating device forming part of a fire-alarm system;

Fig. 30 is a bottom plan thereof;

Fig. 31 is a view partly in section and partly in elevation of a non-reversible transmitter;

Fig. 32 illustrates a manually-operable device for sending in an alarm; and

Fig. 33 is a diagrammatic plan view showing apartments in a building with various units of original disturbance connected with common fuse transmission lines by means of non-reversible transmitters, such as seen in Fig. 31.

Figure 6:
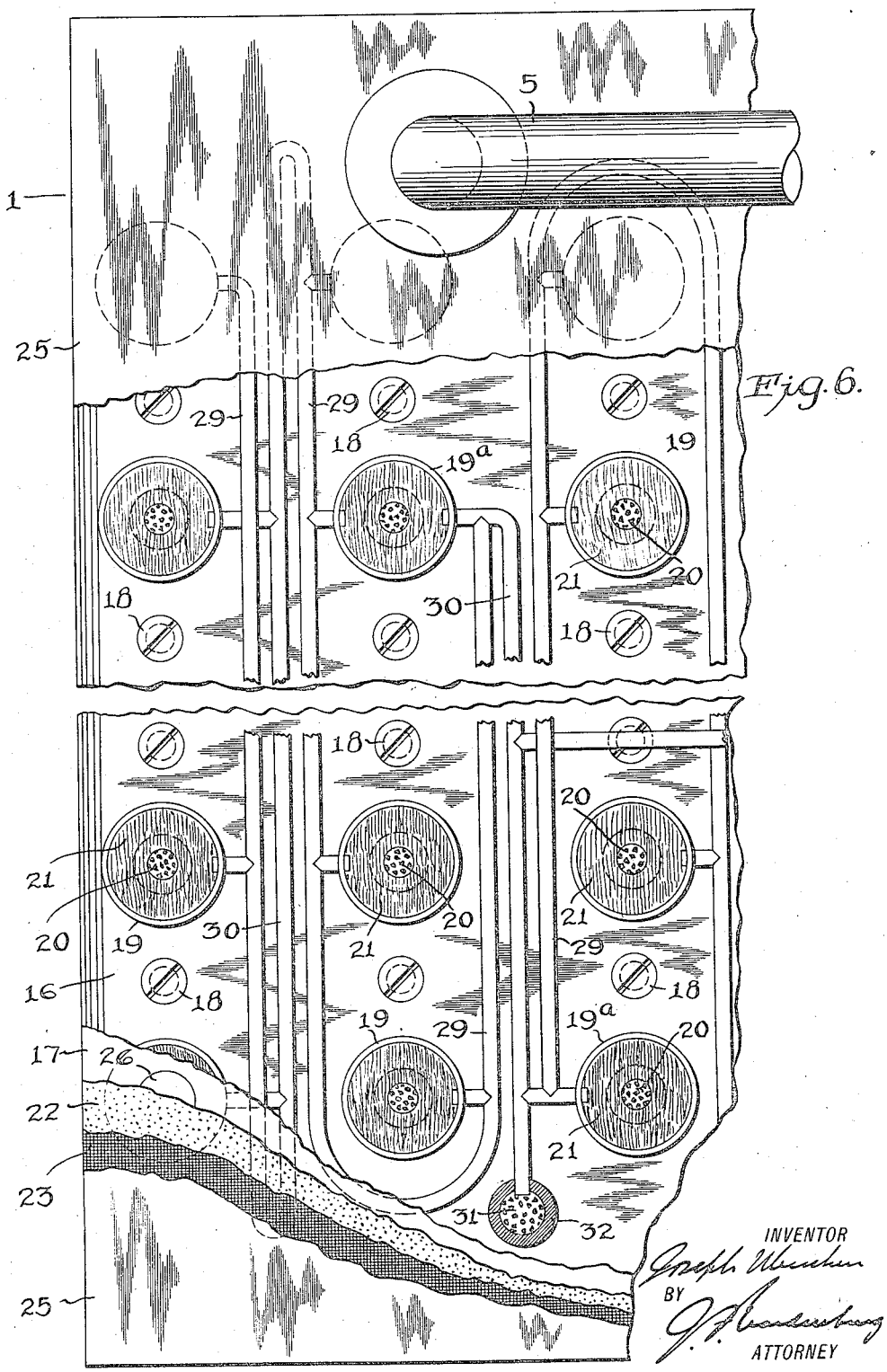
Fig. 6 is an enlarged fragmentary face view of a shield showing successive layers stripped away.

The shield illustrated in Figs. 1 to 9 will first be described. The body of the shield is designated 1, and is hinged at one side at 2 so as to cover the door 3 of the vault 4. It will be capable of being swung open to afford access to the door. 5 is a handle on the shield. The shield proper has openings 6, 7 through it to accommodate the projections on the safe front, that is to say the turn-handle 8 and the combination knob 9, and to afford a view of the combination. The opening 6 is so arranged as to permit the passage of the handle when the latter is in the unlocked position and to be out of registry with said handle when the latter is turned to the locked position, as seen in Fig. 2, whereby when the vault door is locked the shield is also locked in the closed position. A supplementary shield 10 is hingedly mounted at 11 on the outside of the shield proper, and is adapted to cover and inclose the safe projections so as to prevent unauthorized access thereto. When the supplementary shield is in the closed position, the keeper socket 12 in its free end is engaged with the bolt 13 of a key-operated lock 14, preferably of the Yale or similar variety, contained in a casing 15 fixed on the front of the shield proper 1.

The preferred embodiment of the shield proper illustrated in the drawings will now be described in detail, it being understood, however, that numerous modifications may be devised. The said structure comprises a metal back plate or wall 16, constituting the main support, a second sheet or wall 17 spaced forwardly therefrom and united to the back wall by screws 18, and a plurality of cups 19 between the walls and suitably secured to the wall 16. Said cups form pockets containing bodies or deposits of combustible materials, specifically, a central powder pellet 20 of the character to produce a loud report and a surrounding body of material or composition 21 of a character to produce incapacitating fumes or gases. Such material may be sulfur or any one of the known substances or compositions for producing asphyxiating, lachrymatory or sneezing gas, or any combination thereof, the purpose being either to compel the lawbreaker to retreat or to render him helpless so that he may be easily captured. Manifestly the material 21 may be itself in the nature of a combustible or explosive, or a substance affected by the heat of neighboring combustion, or by combination with the products of combustion to produce gases or fumes of the character indicated.

The combustible contents of the shield include a distributed ignition element 22 located behind the face of the shield and of a character to be ignited by blows or penetration creating internal friction. Explosive compounds of this character are known. By suitable regulation of the proportion of composition, the material is caused to withstand ordinary shocks, but is sensitive to forcible tampering of an order which would be necessary to destroy or cut the shield. An explosive composition of a kind which is ignited by percussion and contains ground glass or other friction ingredients is suited for the purposes. The ignition element is preferably disposed as a layer covering the entire outer side of the forward wall 17. It is retained and protected from moisture and corrosion on the outer side, and if desired on the inner side also, by layers of coatings 23, of linen and shellac or the like. Over the outside of the whole is secured a light sheet of metal 25, forming a covering to protect the ignition element from ordinary or accidental contact. The outer layers of the shield may be curved rearwardly and inwardly at the edges, as seen in Figs. 5 and 7. The face plate 25 may thus be held in place, so as to remain under ordinary conditions but so as to be blown off or loosened in event of combustion taking place within. The wall 17 is provided with openings opposite the open sides of the cups 19. These openings are filled by blow-out disks 26, which are normally held in place by pieces of linen or the like 27 shellacked over the disks and the adjoining portions of the wall. In addition, the disks may be lightly soldered or otherwise secured in place, so as to hold firm, except when displaced by explosions or combustion within the cups.

One or a limited number of the cups or pockets marked 19$^a$ are in combustion-communicating relation with the distributed ignition element 22. To this end such pockets are shown provided (see Figs. 7 and 8) with a flash port 28 in its blow-out disk 26$^a$, this port being separated from the ignition element only by a destructible diaphragm formed by the central portion of the piece of linen 27. The cups are interconnected through openings in their walls with a system of relatively slow-burning fuses or trains 29 located between the walls 16 and 17, whereby combustion is communicated from one pocket to another at intervals, so that the detonations and discharges of fumes will continue over a substantial period.

A quick-burning fuse 30 is connected with the starting pockets 19$^a$ and leads to a propelling powder charge 31 in a cup 32 secured within the shield and projecting rearward therefrom. A projectile 33 is held in an opening in the rear side of this cup and is opposite a percussion cap 34 in the face of the fixed structure behind a marginal portion of the shield. Said cap is at the end of another quick-burning fuse section 35$^a$, which may extend, suitably protected, for any desired distance within the building, for communicating the disturbance originating in the shield to means or a variety of mechanisms external thereto.

The supplementary shield 10 comprises suitable supporting and protecting walls or layers 36, 37, 38, with a layer of the ignition material 22 between them. At one point this ignition element communicates through a flash-port 39 with a cup 40 on the rear side of the supplementary shield containing a propelling powder charge 41, which, when exploded, will drive a projectile 42 across the gap against the shield proper 1, whereby the ignition element 22 of said shield is ignited and the action started therein in the same manner as if caused by forcible tampering.

The casing 15 of the lock 14 contains a firing pin 43 having an actuating spring 44, which will drive it against a percussion cap 45 at the end of a branch 30$^a$ of the quick fuse 30. Consequently when this firing pin is released, the quick fuse in the shield proper is ignited, thereby igniting the contents of the starting pockets 19$^a$, from which the slow-burning fuses 29 communicate the disturbance at intervals to the other pockets 19. The quick fuse in the shield proper also ignites the propelling charge, and by means of the projectile 33 transmits the action across the gap to the cap 34, whereby the quick fuse 35$^a$ in the fixed structure is ignited. Means are provided in connection with the lock 14, whereby an attempt to pick this lock or to open it with an improper key causes the release of the firing-pin, with the results indicated.

The lock mechanism is illustrated more particularly in Figs. 3, 5 and 10 to 16. A cam-plate 46 is secured or connected to the barrel of the lock containing the key-slot, so as to turn therewith. The authorized key 47 for opening this lock is one which is not only provided with a definite arrangement of notches in its sides but also possesses a projection 48 on its ends of definite length. Instead of connecting the plate 46 to the turning part of the lock, it may be independently mounted and rotated by the direct action of the key, the flat end portion of which enters a slot 49 in the plate. The projection 48 extends beyond this slot, when the key is inserted, into a hole 50 in a trigger member 51, tiltably supported on a fixed pin 52 in the casing 15, thereby holding the said member against movement. The member 51 forms one part of a compound trigger, the other member whereof, marked 53, is tiltably mounted on the same pivot pin, within the member 51, which is bifurcated to embrace the member 53, as seen in Fig. 14. The member 51 has a cross-pin 54 adapted to contact with the member 53 at one side of the pivot to tilt the same. The two members of the compound trigger are thus pivotally or flexibly jointed, the primary member 51 is capable of rocking and thereby rocking the secondary member 53, and the secondary member is also capable of rocking independently of the primary member. The secondary member is formed with a detent hook 55, which normally engages a lug 56 on the firing-pin 43, thereby holding the latter retracted against the force of its spring.

An arm 57 is swung on a fixed pivot 58 and passes through a cam-slot 59 in the plate 46. To this arm is pivotally connected a displacer finger 60, which lies within the bifurcated primary trigger member 51, between the inner side of the back 61 thereof and the secondary member 53. A spring 62 normally presses the finger against said back of the primary member; and the end of the finger or a shoulder 63 thereon is arranged to thrust against a lug or shoulder 64 on the back.

As will be observed in Fig. 10, if a key with too short a projection is used, the trigger will not be disturbed but the key cannot be turned and the lock therefore cannot be opened, because, the projection does not push the finger 60 away from abutting relation to the trigger member 51; consequently an attempt to turn the key merely causes the cam-slot 59 to press the displacer finger against the immovable trigger member, which blocks the action. The correct key has a projection long enough, as seen in Fig. 11, to move the finger away from the abutment portion of the member 51, but not so long as to force it against the member 53, so as to tilt the latter. Consequently, with such a key, the lock can be operated and the action of the cam-plate on the finger 60 will merely cause the latter to slip idly on the end of the key projection, which holds the primary trigger member 51 against displacement. The secondary trigger member 53 is held against accidental displacement at this time, and while the lock is unlocked, by an L-shaped lug 65 on the plate 46, or other part of the lock, passing over said member. This provision is particularly useful where the lock may be subject to vibration, as in the case of a theft-preventive lock for automobiles.

Fig. 12 shows what happens with a key having no projection to enter the hole in the member 51. In that event turning the key in the direction to unlock causes the cam-plate to thrust the finger 60 in contact with the member 51, which is thereby tilted, and in turn tilts the secondary member 53, which frees the firing-pin 43, starting the combustions and explosions in the shield. At the same time, the unlocking of the lock is prevented, because the lug 65 abuts against the trigger member 53 and prevents further turning of the key before the latter has turned far enough to actually unlock.

With too long a projection on the key (see Fig. 13), or in case a wire is inserted, the act of insertion, before turning, swings the finger 60 away from the member 51 and against the member 53, at the opposite side of its pivot from the detent hook 55, so as to rock this member and release the firing-pin.

Fig. 15 illustrates a slight modification in which the end of a displacer finger 60$^a$ will exert thrust either upon a lug 64 on the member 51 or a lug 66 on the member 53 when the lock is operated, and only in case a key having a projection of proper length is used will pass idly between them.

Figure 17:
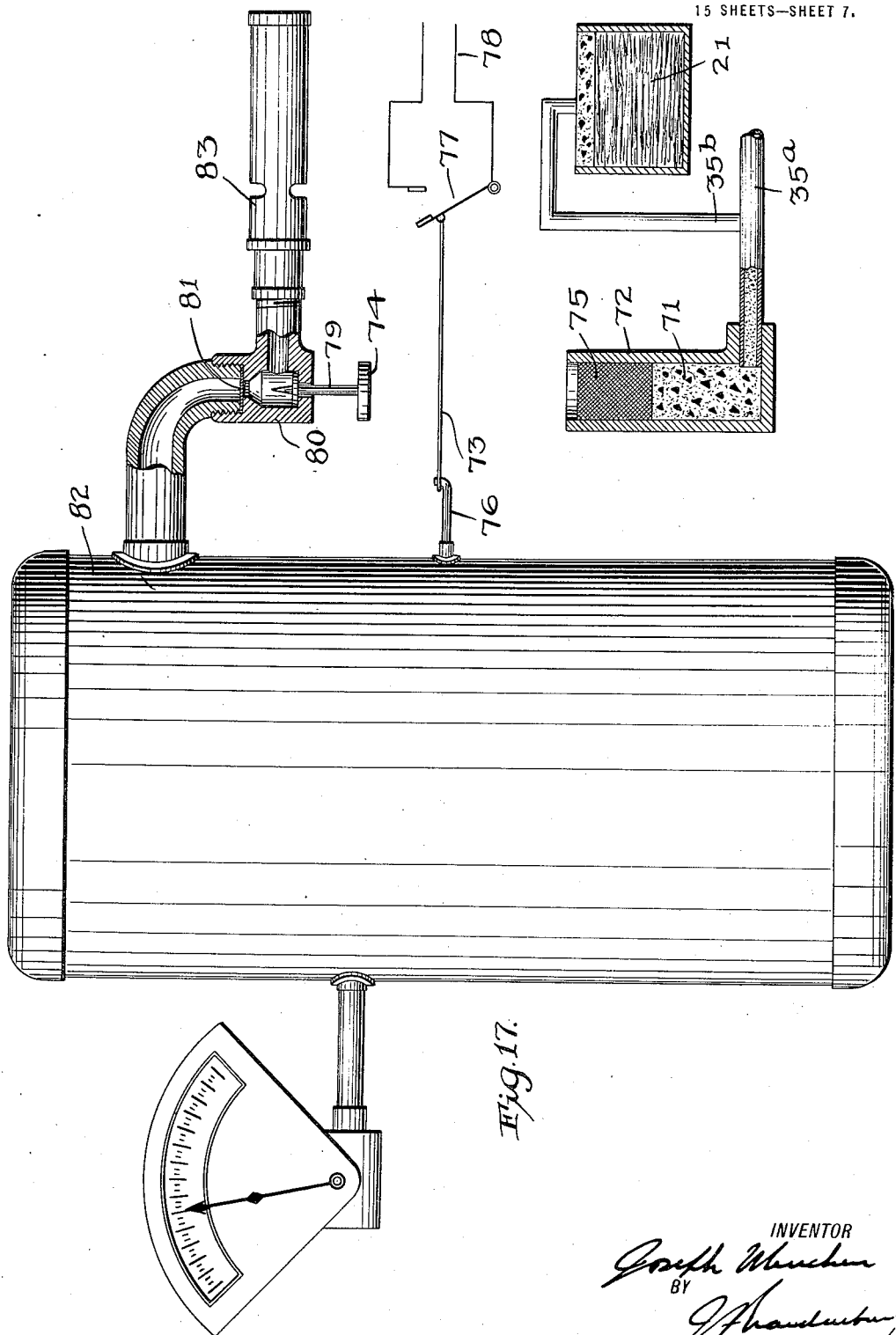
Fig. 17 is a view, partly in elevation and partly in section, showing parts within the niche seen in Fig. 1.

Returning now to the quick fuse 35$^a$ outside of the shell, it will be observed that in Fig. 1 this fuse is shown extending to a recess 70, which for convenience of illustration is shown over the vault door, but may, of course, be located anywhere within the building, or even outside of it. In this recess (see Fig. 17) the fuse leads to an explosive charge 71 contained in a barrel 72 directed toward a wire 73 or other detent or trigger device and a button 74. The wad or projectile 75 in the barrel is thrown by the explosion of the charge against the wire 73, so as to break the same or disengage it from a hook 76, thereby causing an automatic circuit-closer 77 to close, sending in an alarm to police headquarters or elsewhere through an alarm circuit 78. The projectile also actuates the button 74, which has a shank 79 guided in an opening in a conduit 80 and terminating in a penetrating point which then perforates a diaphragm 81 which ordinarily closes the conduit. This permits compressed air or other fluid under pressure to flow from a reservoir 82 through the conduit and a whistle 83 carried thereby, so as to cause the sounding of an alarm blast of long duration. A branch 35$^b$ of the quick fuse may also lead to a body of one or more of the incapacitating gas-producing substances 21, so that if the recess is near the safe or vault, copious quantities of the gas will emanate therefrom, in addition to or instead of those given off by the shield itself.

The open front of the recess 70 is protected by another embodiment of the barrier, which here takes the form of a grill 85. A portion of this grill is illustrated more particularly in Figs. 18 and 19. As preferably constructed, the members of this grill comprise inner tubes 86, constituting body portions, and outer, light, metal, protective sheathings 87. Between these is a layer of the ignition element or compound 22 similar to that used in the shield. The tubes 86 are connected to inner junction members 88, and for additional strength may be connected by sleeves 89, as seen in the upper left-hand corner of Fig. 18. The said junction members 88 are inclosed by a spaced protective covering 90, between which and the junction members lies more of the ignition compound 22. Fig. 19, which is a sectional view through one of the junction regions with the outer protective layer removed, shows that the junction members 88 are preferably provided with blow-off caps 91. The junction members are utilized as containers for incapacitating gas-producing material 21 and detonation charges 20. The tubes 86 are provided at a suitably limited number of starting points with flash-ports 92, which communicate the combustion from the sensitive ignition material 22 to fuses 29$^b$ and 30$^b$ extending through the tubes and connecting with the charges at the junctions. One of these fuses, as the fuse 30$^b$, is a quick fuse connected with the fuse 35$^a$. The other fuses 29$^b$ are slow fuses for causing the majority of the detonation and gas-producing deposits to be ignited at intervals, as in the case of the shield. The access of the flame from the ignition material 22 to the fuses may be facilitated by the presence of easily ignited powder 93 around the fuses inside of the flash-ports 92. It will be understood, therefore, that any attempt to cut or break the grill will ignite the sensitive compound 22, from which the disturbance passes to the fuses 29$^b$ and 30$^b$ and involves progressively all the charges contained in the junctions. The quick fuse 30$^b$ carries the action from the grill to the combustibles and devices within the recess.

Fig. 19 illustrates wires or ligaments 94, which are hooked into adjacent portions of the tubes 86 extending within the junction member 88, where they are corrugated and overlapped and wound about with binding wire, as indicated at 95. These overlapped portions of the ligaments are surrounded by a tube 96 containing more of the sensitive ignition material 22. Owing to this provision any attempt to pull or force the grill apart without actual cutting or breaking will cause the material 22 at the junctions to be ignited by the friction of the ligaments upon each other, thus starting the reactions.

A main fuse 35 connected with the branch 35$^a$ (see Fig. 1) passes through suitable conduits to a signal device 100 in a conspicuous position on the outside of the building (Figs. 20 to 23). Said device comprises a vertical casing 101 supported in projecting position by a bracket 102. The casing 101 has two compartments 103, 103$^a$ containing torches 104, 104$^a$ of a composition to burn for a comparatively long period with liberation of a substantial degree of heat. Of these the torch 104 is subject to the fuse 35 and contains an ingredient or ingredients whereby it burns with a distinctive light, preferably green, indicative of theft or burglary, or, as indicated in Fig. 23, the heat-producing torch proper may communicate by a port or fuse 105 with a separate body of colored light composition 106 disposed behind bulls' eyes 107 in front of the casing.

The combustion of the fuse 35$^b$ on its way to the torch sets off a powder charge 108 contained in a barrel 109 in the interior of the bracket 102, which is hollow. The explosion of this charge displaces a plug 110 which normally restrains the spring-urged arm 111 of an ordinary telegraph alarm transmitter 112, whereby an alarm is sent in to police headquarters or elsewhere, over wires 150 (see Fig. 33). When this electrical alarm transmitter is employed the electrical device represented in Fig. 17 can, of course, be omitted. The arm 111 also bridges two contacts 113 of an electric circuit 114, which energizes a loud-sounding alarm 115, on the order of a Klaxon horn, siren, etc., carried by the bracket.

The fuse 35$^b$ enters the torch 104 at the top, where an igniting charge 116 may be provided, and the torch burns from the top downwardly. A cap 117 displaceable by the generated gases protects the charge from the weather. The other torch 104$^a$ is of similar character, but burns with a different light, preferably red, to indicate fire. This torch is connected with another fuse 35o (see Fig. 20) forming part of a fire-alarm system, and this fuse controls a telegraph alarm transmitter similar to the transmitter 112, which sends in an electrical alarm to fire headquarters or elsewhere, and a sounding alarm like the alarm 115. These parts may be regarded as directly behind those shown in Fig. 23, and it has not been thought necessary to duplicate the illustration.

The torches are beneath a bulb or boiler 118 in the top of the casing 101, which contains alcohol or other substance adapted to produce a gas or vapor in substantial quantity when heated. A conduit 119 leads from the upper part of this boiler to one or more police whistles 120 projecting below the bracket, which are sounded by the gases passing through them. One or more plugs 121 normally close the conduit against evaporation losses and are forced out by the pressure when the boiler is heated by one or other of the torches. Instead of the torches burning with a colored light or having a colored fire composition associated with them, the bulls' eyes 107 may be appropriately colored, but it is desirable to have the flame itself colored as the flare appearing through the open top of the casing affords an especially noticeable signal. The top of the casing is preferably normally closed by a cover 122, applied in such manner that it is dislodged or opened by pressure from within.

There may be one or any suitable number of the signal devices 100 on the outside of the building. As indicated there may be one outside each floor connected with an interior alarm system pertaining to that floor, or there may be one outside each room or apartment, so that the location of trouble within the building will be indicated to those without.

Figs. 29 and 30 illustrate portions of the fire alarm system within the building. At suitable points within the rooms and corridors, preferably beneath the ceiling thereof, receptacles 125 are fastened containing a powder cartridge 126 arranged to ignite a branch 350ª of the fuse 350 passing therein. The receptacle may consist of a rectangular box slidably engaged with a clip 127 fastened to the building. A perforated bottom plate 128 of the box affords ready access of the heat to the powder cartridge and permits escape of generated gases. The powder charge is of predetermined composition to be ignited at a definite elevated temperature. The fuse 350 passes through a suitable conduit 129, the sections of which are fastened to the receptacle by couplings 130.

Between each of the automatic fire-alarm-initiating devices 125 and the main line of the fuse 350 leading to the signal 100 outside the building (see Fig. 33) a nonreversible transmitter, shown in Fig. 31, is inserted. This transmitter is designated as a whole 131, and is similar in principle to the means 32, 33, 35 for transmitting the combustion action from the shield 1 to the burglar alarm fuse 35. The said transmitter preferably comprises a suitable casing 132, capable of being opened, to which are attached the ends of a gap in the branch fuse 350ª. At the arriving end of this gap is a barrel or cup 133 containing a propelling charge 134 and a projectile 135, which is opposite a percussion cap 136 at the end of the other fuse section. With these provisions combustion is transmitted from any one of the initiating devices to the main fuse, but will not pass from the latter to the other devices which were not originally affected.

Similar devices are inserted between the various disturbance-initiating devices of the burglar alarm system and the main burglar alarm fuse 35. Each of the alarm systems is also preferably provided with a watchman's device 140, illustrated in Fig. 32, the same comprising a firing-pin 141 on a spring 142, adapted to be retracted and released by a finger trigger 143, so as to strike a percussion cap 144 at the end of a branch of the fuse system. The non-reversible transmitters 131 can be introduced between various sections of each main fuse as well as in the branches thereof, in order to reduce as much as possible the amount of replacement required after the system has operated.

Fig. 33 is a diagrammatic plan view of a portion of the building illustrating the two systems connected up with the external signal. In this view *a a* represent two safes in different rooms having protective shields or inclosures connected by fuses 35ª with the main burglar alarm fuse 35. *a'* is a protected partition or wall for one of the apartments, which is also connected with the same fuse. Ceiling boxes 125 of the fire alarm system are illustrated in the various rooms connected by their branch fuses 350ª with the main fire alarm fuse 350. The watchmen's wall boxes 140 and the non-reversible transmitters 131 are also indicated. 150 and 151 represent the electrical alarm circuits controlled by the telegraph transmitters, one of which is shown in Fig. 23, for sending fire and burglary alarms, respectively, to a distant point.

Figs. 24 to 28 illustrate a form of sectional protective facing or lining for walls, partitions, ceilings or floors. With some modification to give the elements more structural strength, they might be used to constitute the entirety of a partition. For convenience this form of the barrier will be termed a protective wall. The said wall is composed of slab or tile-like units 175, of convenient size, analogous to the safe or vault front shield, and a plurality of intermediate fuse-bearing strips 176. As the members 175 correspond in general construction and constitution to the shield, a particular description will not be necessary. Suffice it to say that each comprises spaced sheets or plates 177, 178, 179, affording shallow compartments containing cups 19 inclosing detonating and gas producing materials 20 and 21, slow and quick-burning fuses 29 and 30, and a distributed ignition element 22, the latter being placed at the side from which attack may be expected, the whole being organized and arranged substantially as illustrated and described in detail in connection with the safe shield. The quick burning fuse 30 of each of the units terminates in a barrel 180 containing a propelling charge 181 and a bullet 182, which is adapted to be discharged across the gap between the member 175 and the adjoining strip 176. The latter is provided opposite the bullet with a percussion cap 183 adjacent a body of powder 184, which will be ignited thereby to start the combustion of a quick burning fuse 35ª extending through the strip. This fuse constitutes one of the branches 35ª of the main burglary alarm fuse 35. The strip 176 may also be packed with fume-producing material 185. It will thus be seen that in event of any one of the panels 175 being tampered with, its combustion means will be ignited and the disturbance will be transmitted to an adjoining strip 176 containing a fuse running to the distant alarm, but owing to the non-reversible transmitters arranged between the fuses 30 and the fuses 35ª, the other panel sections 175 are not affected. The panel sections 175 are provided with dovetail projections 186 and recesses 187 to lock with each other and with projections 188 on the strips 176. In addition, the joints are preferably closed upon the exposed side by facing strips 189.

What I claim as new is:

1. A theft or burglary preventive barrier containing explosive and combustible materials adapted and arranged to be ignited by forcible tampering and to produce continuing detonations and incapacitating gases.

2. A theft or burglary preventive barrier containing a distributed ignition element of a character to be ignited by blows or penetration, and means to be ignited thereby to produce continuing detonation.

3. A theft or burglary preventive barrier containing a distributed ignition element of a character to be ignited by blows or penetration, and means to be ignited thereby to produce offensive gases.

4. A theft or burglary preventive barrier containing a distributed ignition element of a character to be ignited by blows or penetration, and means to be ignited thereby to produce continuing discharges of incapacitating gases.

5. A theft or burglary preventive barrier containing a distributed ignition element of a character to be ignited by blows or penetration, and means to be ignited thereby to produce both continuing detonations and incapacitating gases.

6. A theft or burglary preventive barrier containing materials adapted to be ignited by forcible tampering and to generate incapacitating gases.

7. Theft or burglary preventive means comprising a barrier and means to produce discharge of incapacitating gases in event of tampering with the barrier.

8. In theft or burglary preventive means, a barrier containing a distributed ignition element consisting of a compound capable of being ignited by blows or internal friction, and defensive or alarm means adapted to be brought into action by the combustion of said ignition element.

9. A protective covering containing distributed combustible material adapted to be ignited by blows or penetration at any point, together with segregated deposits arranged to be ignited successively as the result of an initial ignition due to tampering.

10. A protective covering containing distributed combustible material adapted to be ignited by blows or penetration at any point, together with segregated deposits and fuse connections whereby said deposits are ignited successively over a substantial period of time as the result of an initial ignition due to tampering.

11. A protective covering containing distributed combustible material adapted to be ignited by blows or penetration at any point, together with segregated deposits arranged to be ignited successively as the result of an initial ignition due to tampering, said deposits being of a character to produce detonations.

12. A protective covering containing distributed combustible material adapted to be ignited by blows or penetration at any point, together with segregated deposits arranged to be ignited successively as the result of an initial ignition due to tampering, said deposits being of a character to produce discharges of incapacitating gases.

13. A theft or burglary preventive barrier containing distributed combustible material adapted to be ignited by blows or penetration, both quick and slow fuse connections, and segregated deposits adapted to be ignited over a substantial period of time as the result of an initial ignition.

14. In a theft or burglary preventive system, a barrier containing distributed combustible material adapted to be ignited by blows or penetration, segregated deposits adapted to be ignited over a substantial period of time as the result of an initial ignition, and both quick and slow fuse connections, in combination with external defensive or alarm means adapted to be brought into action by the quick fuse.

15. In a theft or burglary preventive system, a barrier containing distributed combustible material adapted to be ignited by blows or penetration, segregated deposits adapted to be ignited over a substantial period of time as the result of an initial ignition, and both quick and slow fuse connections, in combination with external alarm means in operative relation to the quick fuse connection.

16. In a theft or burglary preventive system, a barrier containing distributed combustible material adapted to be ignited by blows or penetration, and fuse means for carrying the combustion outside of the barrier, in combination with an external defensive or alarm agency having operative connection with said fuse means.

17. A shield for safe and vault fronts containing explosive and combustible materials adapted to be ignited by blows or penetration at any point.

18. A shield for safe and vault fronts containing explosive and combustible materials adapted to be ignited by blows or penetration at any point, and including detonating bodies connected to explode at intervals.

19. A shield for safe and vault fronts containing explosive and combustible materials adapted to be ignited by blows or penetration at any point and including means for producing incapacitating gases.

20. A shield for safe and vault fronts containing explosive and combustible materials adapted to be ignited by blows or penetration at any point and including means for producing continuing detonations and liberating incapacitating gases.

21. A shield for safe and vault fronts, comprising walls, pockets of combustible materials therein, fuses connecting the pockets, and a distributed ignition element behind the face of the shield.

22. A protective shield or covering comprising walls, pockets of combustible materials therebetween, fuses connecting the pockets, a distributed ignition element over the outer of said walls, and a facing over the ignition element.

23. A protective shield or covering containing pockets of combustible materials, fuse connections, a distributed ignition element of a character to be ignited by blows or penetration, and means of communication between said ignition element and a minor number of said pockets.

24. A theft or burglary preventive barrier containing pockets of combustible materials, fuses connecting said pockets, a distributed ignition element beneath the surface of the barrier adapted to be ignited by blows or penetration, and means of communication between said ignition element and a minor number of said pockets.

25. A theft or burglary preventive barrier containing pockets of combustible materials, fuses connecting said pockets, a distributed ignition element adapted to be ignited by blows or penetration, means of communication between said element and a minor number of said pockets, and means covering said ignition element to protect the same from ordinary shocks and moisture.

26. A shield for safe and vault fronts, containing combustible materials including a distributed ignition element adapted to be ignited by blows or penetration, and a fuse in the shield, in combination with a fuse extending in the stationary structure, and means whereby the action is transmitted across a gap from the fuse in the shield to the fuse in the stationary structure.

27. A shield for safe and vault fronts, containing combustible materials including a distributed ignition element adapted to be ignited by blows or penetration, and a fuse in the shield, in combination with a fuse extending in the stationary structure, alarm means connected with the latter fuse, and means whereby the action is transmitted across a gap from the fuse in the shield to the fuse in the stationary structure.

28. A shield for safe and vault fronts, containing combustible materials including a distributed ignition element adapted to be ignited by blows or penetration, a fuse, and a propelling charge and projectile carried by the shield connected with said fuse, in combination with a fuse extending in the stationary structure, and percussion means at the end of the latter fuse opposite the projectile on the shield.

29. A grill the members whereof contain explosive and combustible materials including a distributed ignition element beneath the surface of a character to be ignited by blows or penetration.

30. A grill, the members whereof contain a distributed ignition element adapted to be ignited by blows or penetration, and detonating bodies connected so as to explode at intervals.

31. A grill, the members whereof contain a distributed ignition element adapted to be ignited by blows or penetration, and means for liberating incapacitating gases.

32. A grill, the members whereof contain a distributed ignition element adapted to be ignited by blows or penetration, pockets of combustible materials, and fuses, arranged so that said pockets are affected at intervals, in combination with a quick fuse in the grill leading to alarm means at a distance.

33. A grill, the bars and junctions of which contain a distributed ignition element below the surface, fuses extending in the bars, and pockets of combustible materials within the junctions.

34. In a theft or burglary preventive system, the combination of a barrier containing a distributed ignition element adapted to be ignited by blows or penetration, and a fuse, combined with means ouside of the barrier itself in operative relation to said fuse for producing incapacitating gases.

35. A shield for safe and vault fronts, comprising a shield proper having openings for the safe projections and containing explosive and combustible materials including a distributed ignition element sensitive to blows or penetration, and a supplementary shield provided with a similar ignition element, for covering the safe projections.

36. A shield for safe and vault fronts, comprising a shield proper having openings for the safe projections and containing explosive and combustible materials including a distributed ignition element sensitive to blows or penetration, a supplementary shield provided with a similar ignition element, for covering the safe projections, a lock for said supplementary shield, and means whereby tampering with the lock starts disturbance in the shield.

37. A shield for safe and vault fronts, comprising a shield proper having openings for the safe projections and containing explosive and combustible materials including a distributed ignition element sensitive to blows or penetration, a supplementary shield provided with a similar ignition element, for covering the safe projections, a lock for said supplementary shield, a fuse, and means whereby tampering with the lock causes ignition of said fuse.

38. A shield for safe and vault fronts, comprising a shield proper having openings for the safe projections and containing explosive and combustible materials including a distributed ignition element sensitive to blows or penetration, and a supplementary shield provided with a similar ignition element, for covering the safe projections, said supplementary shield bearing also a propelling charge and a projectile to be fired across the gap against the main shield.

39. A grill containing ignition material and frictional means whereby an attempt to force the grill will set off said material.

40. A grill containing ignition material, and corrugated ligaments connected to the members of the grill and bound at their overlapping portions in contiguity to said ignition material, whereby friction resulting from an attempt to force the grill will set off said material.

41. A protective sheathing for walls composed of panels containing explosive and combustible materials with a distributed ignition element sensitive to forcible tampering, and fuse means for conducting the disturbance to a distance for actuating an alarm.

42. A protective sheathing for walls composed of panels containing explosive and combustible materials with a distributed ignition element sensitive to forcible tampering, strips containing fuses forming branches of an alarm system, and non-reversible means for communicating the disturbance from the panels to the strips.

43. A protective sheathing for walls composed of panels containing explosive and combustible materials with a distributed ignition element sensitive to forcible tampering, strips containing fuses forming branches of an alarm system, propelling charges with projectiles in the panels, and percussion means in the strips opposite the projectiles for communicating the disturbance from the panels to the strips, but not reversely.

44. In an alarm system, the combination of loci adapted to originate a combustion disturbance, branched fuse means connecting said loci with the alarm means, and non-reversible transmitters between the loci and the common portions of the fuse means.

45. In an alarm system, the combination of alarm means, a plurality of loci adapted to originate a combustion disturbance, branched fuse means connecting said loci with the alarm means, and non-reversible transmitters between the loci and the common portions of the fuse means, said transmitters comprising each a propelling charge with a projectile and percussion means opposite the projectile.

46. In an alarm system, means within a building adapted to originate a combustion disturbance in event of an abnormal condition, fuse means leading therefrom, and an electrical alarm circuit subject to said fuse means.

47. In an alarm system, means within a building adapted to orginate a combustion disturbance in event of an abnormal condition, fuse means leading therefrom, and alarm means on the outside of the building subject to said fuse means.

48. In an alarm system, the combination of a plurality of loci within a building adapted to originate a combustion disturbance in event of abnormal condition, fuse means leading therefrom, and alarm means on the outside of the building connected with said fuse means to indicate the existence and location of trouble within the building.

49. In an alarm system, the combination of a torch outside of a building, fuse means leading from the interior of the building to said torch, and means in the building whereby an abnormal condition ignites said fuse means.

50. In an alarm system, the combination of a torch outside of a building, fuse means leading from the interior of the building to said torch, means in the building whereby an abnormal condition ignites said fuse means, a boiler arranged to be heated by said torch, and an alarm adapted to be actuated by the pressure produced in said boiler.

51. In an alarm system, the combination of a torch outside of a building, fuse means leading from the interior of the building to said torch, means in the building whereby an abnormal condition ignites said fuse means, a boiler arranged to be heated by said torch, and a whistle connected with said boiler.

52. The combination of dual systems within a building adapted to originate and transmit combustion disturbance, one being sensitive to fire and the other to burglary or tampering, separate fuse means extending from said systems, and torches upon the outside of the building connected, respectively, with said fuse means and adapted to burn with different colors, said torches being incorporated in a single fixture.

JOSEPH MENCHEN.